US010558895B2

(12) United States Patent
Linden

(10) Patent No.: US 10,558,895 B2
(45) Date of Patent: Feb. 11, 2020

(54) DEEP LEARNING FOR THREE DIMENSIONAL (3D) GAZE PREDICTION

(71) Applicant: Tobii AB, Danderyd (SE)

(72) Inventor: Erik Linden, Danderyd (SE)

(73) Assignee: Tobii AB, Danderyd (SE)

( * ) Notice: Subject to any disclaimer, the term of this patent is extended or adjusted under 35 U.S.C. 154(b) by 88 days.

(21) Appl. No.: 15/941,980

(22) Filed: Mar. 30, 2018

(65) Prior Publication Data

US 2019/0303722 A1 Oct. 3, 2019

(51) Int. Cl.
G06K 9/62 (2006.01)
G06F 3/01 (2006.01)
G06T 3/00 (2006.01)
G06T 7/73 (2017.01)

(52) U.S. Cl.
CPC .......... G06K 9/6262 (2013.01); G06F 3/013 (2013.01); G06T 3/0093 (2013.01); G06T 7/74 (2017.01); *G06T 2207/20081* (2013.01); *G06T 2207/20084* (2013.01); *G06T 2207/30201* (2013.01); *G06T 2210/22* (2013.01)

(58) Field of Classification Search
CPC ....... G06K 9/6262; G06T 3/0093; G06T 7/74; G06T 2210/22; G06T 2207/20081; G06T 2207/20084; G06T 2207/30201; G06F 3/013
See application file for complete search history.

(56) References Cited

U.S. PATENT DOCUMENTS

| 6,204,828 | B1 | 3/2001 | Amir et al. |
| 6,456,438 | B1 * | 9/2002 | Lee ......................... G02B 27/01 359/630 |
| 7,113,170 | B2 | 9/2006 | Lauper et al. |
| 7,742,623 | B1 * | 6/2010 | Moon ................. G06K 9/00604 382/103 |
| 8,885,882 | B1 * | 11/2014 | Yin ........................... G06F 3/00 382/103 |

(Continued)

OTHER PUBLICATIONS

Mohsen Mansouryar et al. "3D Gaze Estimation from 2D Pupil Positions on Monocular Head-Mounted Eye Trackers" s technical report was presented at ETRA 2016, Mar. 4-17, 2016, Charleston, SC, USA, pp. 1-6.*

(Continued)

*Primary Examiner* — Samir A Ahmed
(74) *Attorney, Agent, or Firm* — Kilpatrick Townsend & Stockton LLP

(57) ABSTRACT

Techniques for generating 3D gaze predictions based on a deep learning system are described. In an example, the deep learning system includes a neural network. A scaled image is generated from 2D image showing a user face based on a rough distance between the user eyes and a camera that generated the 2D image. Image crops at different resolutions are generated from the scaled image and include a crop around each of the user eyes and a crop around the user face. These crops are input to the neural network. In response, the neural network outputs a distance correction and a 2D gaze vector per user eye. A corrected eye-to-camera distance is generated by correcting the rough distance based on the distance correction. A 3D gaze vector for each of the user eyes is generated based on the corresponding 2D gaze vector and the corrected distance.

20 Claims, 13 Drawing Sheets

(56) References Cited

U.S. PATENT DOCUMENTS

| | | | |
|---|---|---|---|
| 9,619,020 B2 | 4/2017 | George-Svahn et al. | |
| 2003/0076300 A1* | 4/2003 | Lauper | G06F 3/013 345/158 |
| 2013/0114043 A1* | 5/2013 | Balan | G02B 27/017 351/210 |
| 2013/0169560 A1 | 7/2013 | Cederlund et al. | |
| 2014/0247232 A1 | 9/2014 | George-Svahn et al. | |
| 2015/0199018 A1* | 7/2015 | Kim | G06F 3/017 345/156 |
| 2015/0304560 A1* | 10/2015 | Joshi | G06F 3/017 348/372 |
| 2016/0065903 A1* | 3/2016 | Wang | B60R 11/04 348/148 |
| 2017/0119298 A1* | 5/2017 | Cheung | G06F 3/013 |
| 2017/0132496 A1* | 5/2017 | Shoaib | G06K 9/66 |

OTHER PUBLICATIONS

Jixu Chen et al. "3D Gaze Estimation with a Single Camera without IR Illumination", 19th International Conference on Pattern Recognition (ICPR 2008), IEEE, 2008, pp. 1-4.*

Shay Ohayon et al., "Robust 3D Head Tracking Using Camera Pose Estimation", Proceedings of the 18th International Conference on Pattern Recognition (ICPR'06), IEEE, 2008, pp. 1-4.*

\* cited by examiner

US 10,558,895 B2

DEEP LEARNING FOR THREE DIMENSIONAL (3D) GAZE PREDICTION

TECHNICAL FIELD

The present application relates to gaze detection systems and methods. In an example, such systems and methods rely on deep learning systems, such as neural networks to detect three dimensional (3D) gaze.

BACKGROUND

Interaction with computing devices is a fundamental action in today's world. Computing devices, such as personal computers, tablets, smartphones, are found throughout daily life. In addition, computing devices that are wearable, such as wearable headset devices (e.g., virtual reality headsets and augmented reality headsets), are becoming more popular. The systems and methods for interacting with such devices define how they are used and what they are used for.

Advances in eye tracking technology have made it possible to interact with a computing device using a person's gaze information. In other words, the location on a display the user is gazing at. This information can be used for interaction solely, or in combination with a contact-based interaction technique (e.g., using a user input device, such as a keyboard, a mouse, a touch screen, or another input/output interface).

Previously proposed interaction techniques using gaze information can be found in U.S. Pat. No. 6,204,828, United States Patent Application Publication 20130169560, U.S. Pat. No. 7,113,170, United States Patent Application Publication 20140247232, and U.S. Pat. No. 9,619,020. The full specification of these patents and applications are herein incorporated by reference.

Generally, gaze-based interaction techniques rely on detecting a gaze of a user on a gaze point. Existing systems and methods can accurately detect two dimensional (2D) gaze. Recently, neural networks have been implemented to detect such 2D gazes.

Attempts have been made to expand existing techniques that rely on neural network to three dimensional (3D) gaze. However, the accuracy of the prediction is not as good as the one for 2D gaze. Absent accurate 3D gaze tracking, support of stereoscopic displays and 3D applications is significantly limited. Further, even in the 2D domain, a neural network is typically trained for a specific camera and screen configuration (e.g., image resolution, focal length, distance to a screen of a computing device, a size of the screen, and the like). Thus, anytime the configuration changes (e.g., different image resolution, different screen size, and the like), the neural network can no longer predict 2D gaze at an acceptable accuracy. Re-training of the neural network for the new configuration would be needed.

SUMMARY

Embodiments of the present disclosure relate to three dimensional (3D) gaze detection based on a deep learning system. In an example, an eye tracking system generates, based on a two dimensional (2D) image, a warped image centered around a user eye from the 2D image. The 2D image is generated by a camera associated with the eye tracking system. The eye tracking system inputs, to a neural network, the warped image. The neural network predicts a distance correction, a 2D gaze origin of the user eye in the warped image, and a 2D gaze direction of the user eye in the warped image based on the warped image. The eye tracking system generates a corrected distance between the user eye and the camera by at least updating an estimated distance based on the distance correction. Further, the eye tracking system generates 3D gaze information for the user eye based on the 2D gaze origin, the 2D gaze direction, and the corrected distance.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
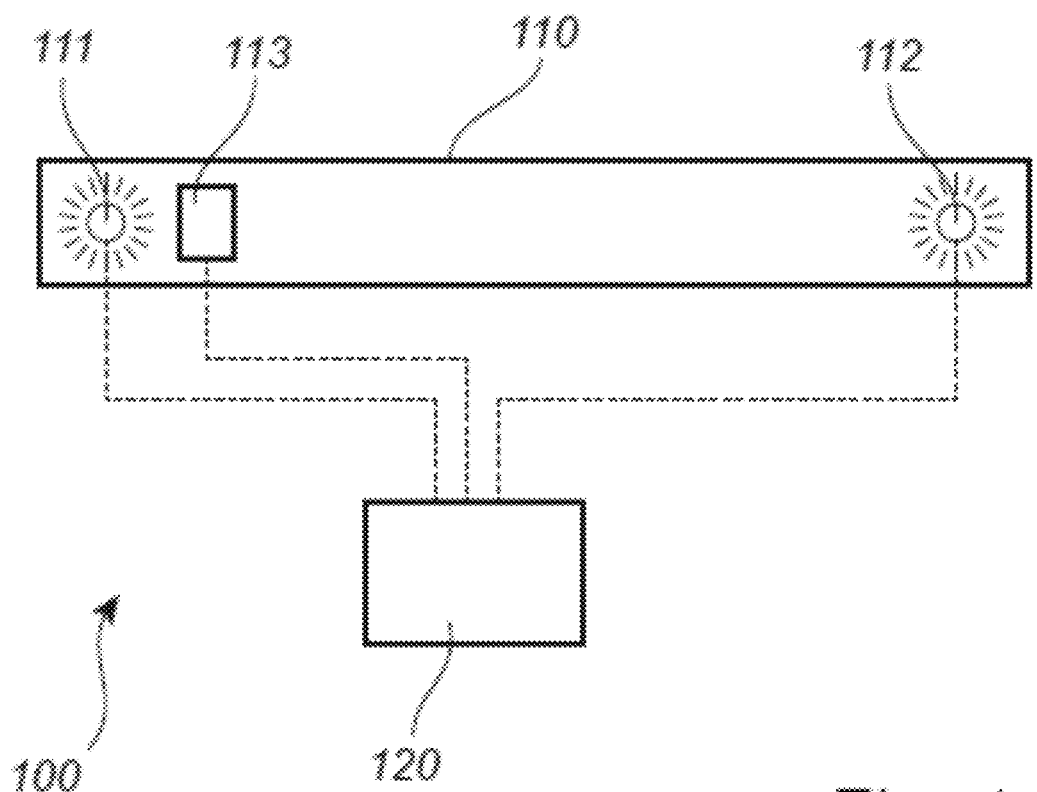
FIG. 1 shows an eye tracking system, according to an embodiment.

Embodiments of the present disclosure relate to three dimensional (3D) gaze detection based on a deep learning system. In an example, a neural network is used. This neural network is usable independently of a camera and screen configuration. In other words, regardless of the specific camera, screen, and combination of camera and screen configuration, the neural network is properly trained to predict gaze information in support of 3D gaze detection.

More particularly, a camera captures a two dimensional (2D) image of a user gazing at a point in 3D space. A rough distance between the camera and the user's eyes is estimated from this 2D image. The 2D image is normalized to generate warped images centered around the user's eye at a high resolution and a warped image around the user's face is generated at a low resolution. These warped images are input to the neural network that, in turn, predicts a 2D gaze vector per eye and a distance correction for the rough distance. A position of eye in 3D space is estimated based on the rough distance and the distance correction, and a position of the camera in the 3D space. Based on a mapping function between the 2D space and the 3D space, each 2D gaze vector is mapped to a 3D gaze direction. The 3D position of an eye and its 3D gaze direction indicate the 3D gaze associated with that eye.

Because, a normalized 2D image is used and because the neural network predicts a distance correction and 2D gaze vectors, the neural network's predictions do not depend on the camera and screen configuration. Hence, that same trained neural network can be used across different eye tracking systems including ones integrated with different types of smartphones, tablets, laptops, wearable headset devices (e.g., virtual reality and augmented reality headsets), and standalone eye tracking systems. Further, because 3D gaze is detected, stereoscopic displays and 3D applications can be supported.

The training of the neural network generally relies on training images that are diverse with respect to the locations of gaze points relative to 2D planes of cameras used to capture the training images (e.g., for each camera, an X, Y plane perpendicular to the camera's line-of-sight). In particular, some of the training images show user eyes that gazed at gaze points located in the 2D planes of the cameras, while other training images show user eyes that gazed at gaze points outside of the 2D planes. During the training, the neural network looks for gaze angles between user eyes-cameras and user uses-gaze points and eye-to-camera distances. Because diversity is used, the neural network can correctly find the angles and the distances. Gaze lines (also referred to as gaze rays) are predicted from the gaze angles and distances between the gaze points and the gaze lines (gaze point-to-gaze line distances) are computed. The loss function of the neural network involves gaze point-to-gaze line distances. During the training, the parameters of the neural network (e.g., weights of connection between nodes at the different layers) are updated to minimize the loss function by minimizing the difference between the true and predicted gaze point-to-gaze line distances. In the interest of brevity, from herein forward, an image refers to a 2D image, unless otherwise indicated.

These and other features of training and using the neural network for 3D gaze prediction independently of a camera and screen configuration are further described herein below. Various components and configurations of eye tracking systems are described herein next to provide a better understanding of the 3D gaze prediction techniques.

Furthermore, during the training, the neural network learns "n" calibration parameters for the persons shown in the training images. A designer of the neural network needs only to specify the number "n" rather than actually specifying the calibration parameters. These parameters are input to layers of the neural network and become a part of the training. Upon completion of the training, an end user operating a tracking system typically follows a calibration process. Part of this process, calibration images (e.g., where the end user is asked to gaze at particular points) are input to the neural network that then generates the "n" calibration parameters for the user. These parameters are used in the gaze prediction for the end user.

FIG. 1 shows an eye tracking system 100 (which may also be referred to as a gaze tracking system), according to an embodiment. The system 100 comprises illuminators 111 and 112 for illuminating the eyes of a user, and an image sensor 113 for capturing images of the eyes of the user. The illuminators 111 and 112 may for example, be light emitting diodes emitting light in the infrared frequency band, or in the near infrared frequency band. The image sensor 113 may for example be a camera, such as a complementary metal oxide semiconductor (CMOS) camera or a charged coupled device (CCD) camera. The camera is not limited to be an IR camera or a depth camera or a light-field camera. The shutter mechanism of the image sensor can either be a rolling shutter or a global shutter.

A first illuminator 111 is arranged coaxially with (or close to) the image sensor 113 so that the image sensor 113 may capture bright pupil images of the user's eyes. Due to the coaxial arrangement of the first illuminator 111 and the image sensor 113, light reflected from the retina of an eye returns back out through the pupil towards the image sensor 113, so that the pupil appears brighter than the iris surrounding it in images where the first illuminator 111 illuminates the eye. A second illuminator 112 is arranged non-coaxially with (or further away from) the image sensor 113 for capturing dark pupil images. Due to the non-coaxial arrangement of the second illuminator 112 and the image sensor 113, light reflected from the retina of an eye does not reach the image sensor 113 and the pupil appears darker than the iris surrounding it in images where the second illuminator 112 illuminates the eye. The illuminators 111 and 112 may for example, take turns to illuminate the eye, so that every first image is a bright pupil image, and every second image is a dark pupil image.

The eye tracking system 100 also comprises circuitry 120 (for example including one or more processors) for processing the images captured by the image sensor 113. The circuitry 120 may for example, be connected to the image sensor 113 and the illuminators 111 and 112 via a wired or a wireless connection. In another example, circuitry 120 in the form of one or more processors may be provided in one or more stacked layers below the light sensitive surface of the image sensor 113.

Figure 2:
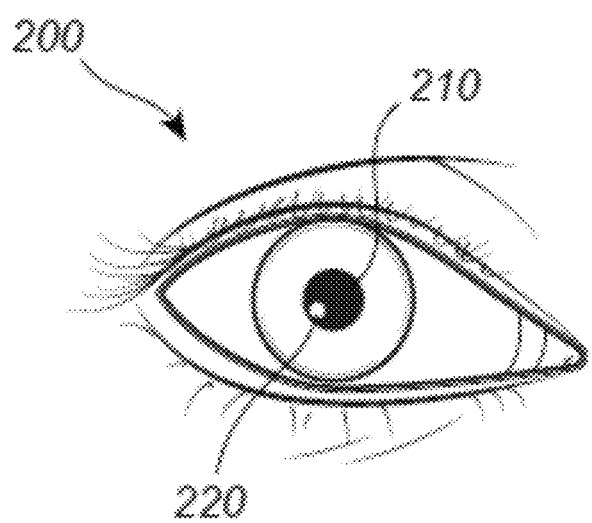
FIG. 2 shows an example of an image of an eye captured by an image sensor, according to an embodiment.

FIG. 2 shows an example of an image of an eye 200, captured by the image sensor 113. The circuitry 120 may for example, employ image processing (such as digital image processing) for extracting features in the image. The circuitry 120 may for example employ pupil center cornea reflection (PCCR) eye tracking to determine where the eye 200 is looking. In PCCR eye tracking, the processor 120 estimates the position of the center of the pupil 210 and the position of the center of a glint 220 at the eye 200. The glint 220 is caused by reflection of light from one of the illuminators 111 and 112. The processor 120 calculates where the user is in space using the glint 220 and where the user's eye 200 is pointing using the pupil 210. Since there is typically an offset between the optical center of the eye 200 and the fovea, the processor 120 performs calibration of the fovea offset to be able to determine where the user is looking. The gaze directions obtained from the left eye and from the right eye may then be combined to form a combined estimated gaze direction (or viewing direction). As will be described below, many different factors may affect how the gaze directions for the left and right eyes should be weighted relative to each other when forming this combination.

In the embodiment described with reference to FIG. 1, the illuminators 111 and 112 are arranged in an eye tracking module 110 placed below a display watched by the user. This arrangement serves only as an example. It will be appreciated that more or less any number of illuminators and image sensors may be employed for eye tracking, and that such illuminators and image sensors may be distributed in many different ways relative to displays watched by the user. It will be appreciated that the eye tracking scheme described in the present disclosure may, for example, be employed for remote eye tracking (for example in a personal computer, a smart phone, or integrated in a vehicle) or for wearable eye tracking (such as in virtual reality glasses or augmented reality glasses).

Figure 3:
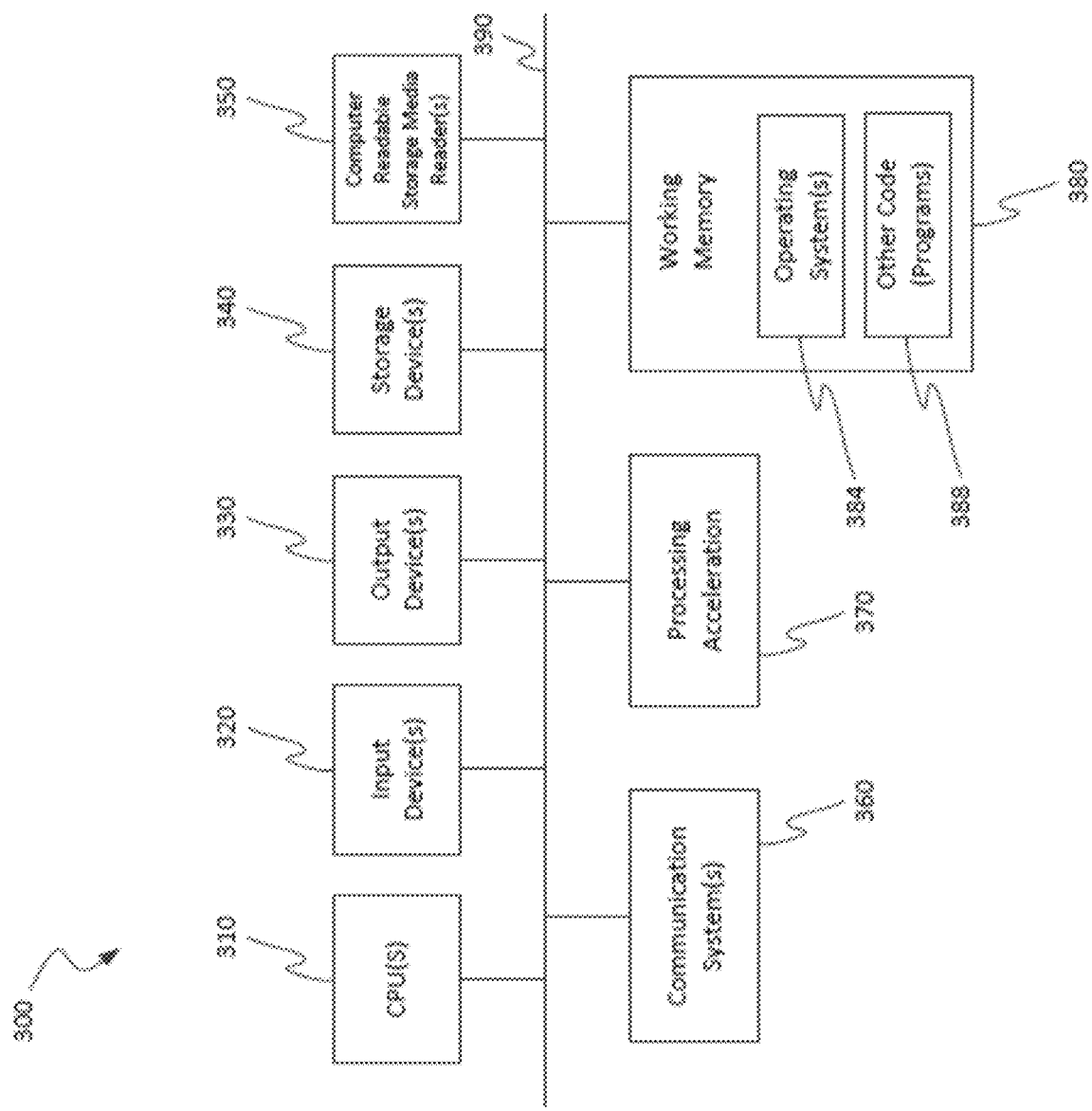
FIG. 3 is a block diagram illustrating a specialized computer system, according to an embodiment.

FIG. 3 is a block diagram illustrating a specialized computer system 300 in which embodiments of the present disclosure may be implemented. This example illustrates a specialized computer system 300 such as may be used, in whole, in part, or with various modifications, to provide the functions of components described herein.

Specialized computer system 300 is shown comprising hardware elements that may be electrically coupled via a bus 390. The hardware elements may include one or more central processing units 310, one or more input devices 320 (e.g., a mouse, a keyboard, eye tracking device, etc.), and one or more output devices 330 (e.g., a display device, a printer, etc.). Specialized computer system 300 may also include one or more storage devices 340. By way of example, storage device(s) 340 may be disk drives, optical storage devices, solid-state storage devices such as a random access memory ("RAM") and/or a read-only memory ("ROM"), which can be programmable, flash-updateable and/or the like.

Specialized computer system 300 may additionally include a computer-readable storage media reader 350, a communications system 360 (e.g., a modem, a network card (wireless or wired), an infra-red communication device, Bluetooth™ device, cellular communication device, etc.), and working memory 380, which may include RAM and ROM devices as described above. In some embodiments, specialized computer system 300 may also include a processing acceleration unit 370, which can include a digital signal processor, a special-purpose processor and/or the like.

Figure 4:
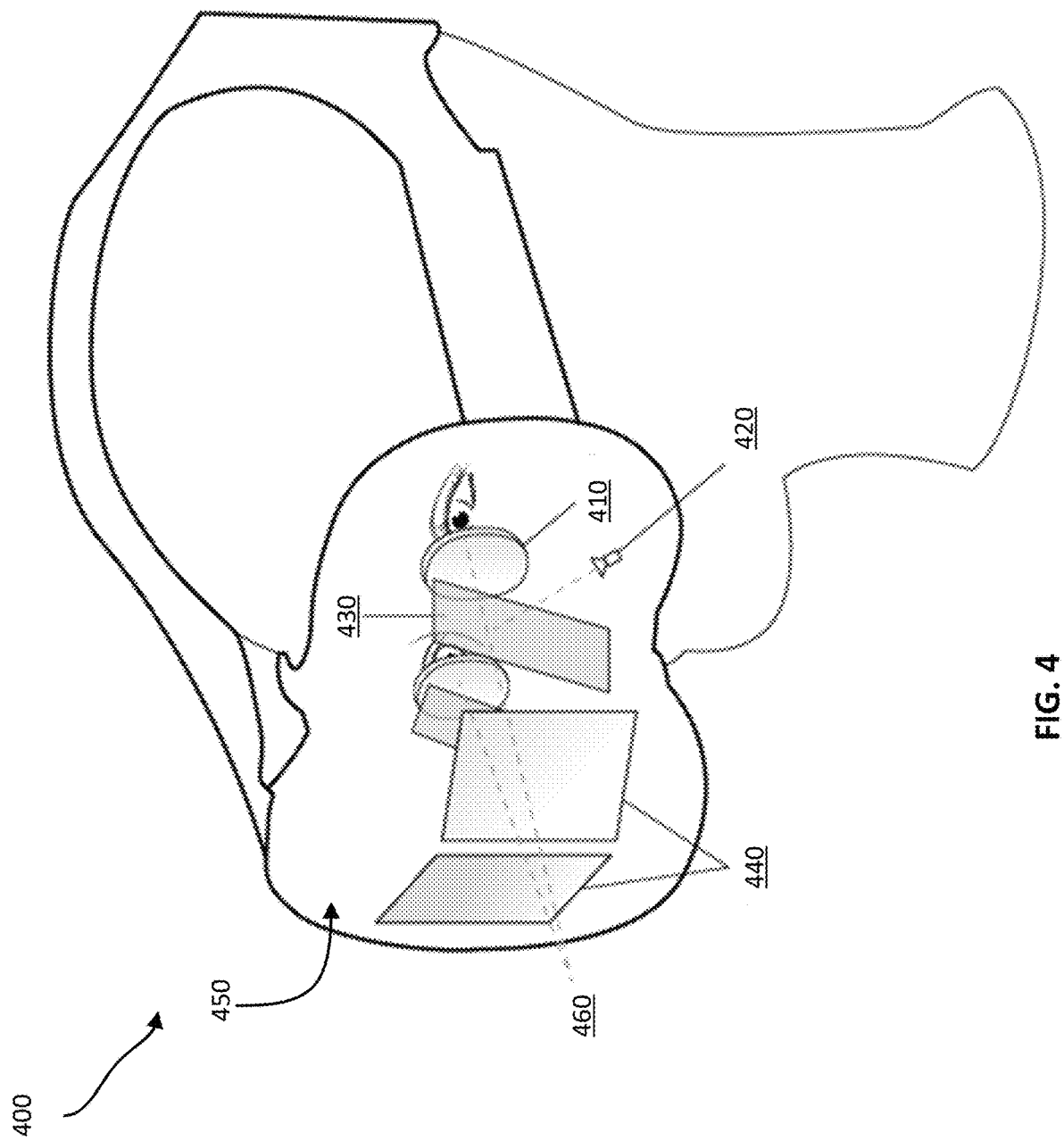
FIG. 4 shows an example of a wearable computing device that implements components of an eye tracking system, according to an embodiment.

FIG. 4 shows an example of a wearable computing device 400 that implements some or all of the above components of an eye tracking system as described in connection with FIGS. 1-2. The wearable computing device 400 can be a VR headset or an AR headset that can be worn by a user. As illustrated, the wearable computing device 400 includes a set of lenses 410, such as Fresnel lenses, a set of cameras 420, a set of hot mirrors 430 (e.g., as further illustrated in FIGS. 12-14, the set includes two hot mirrors for each eye in various embodiments), and a set of displays 440. The camera 420 can include the image sensors 113 of FIG. 1. Although not shown in FIG. 4, the wearable computing device 400 can also include a set of illuminators and processing circuitry. These and other components can be integrated within a housing 450 of the wearable computing device 400. In this way, upon the user mounting the wearable computing device 400 on his or her head, the set of lenses 410 would be relatively close to the user's eyes and the set of displays would be relatively far from the user's eye, and the remaining components may be located in between. The arrangement of these components allows the detection of the user's gaze point in three dimensional virtual or real space.

Herein next, the use of a deep learning system for 3D gaze prediction is described. In the interest of clarity of explanation, this system is described in connection with a camera, a screen, and two user eyes (e.g., the camera captures images, some or all of which show the two user eyes). The deep learning system can be used with an arbitrary camera and screen configuration for eye tracking that uses visible light, passive infrared, active bright-pupil (BP) infrared, and the like. However, the embodiments of the present disclosure are not limited as such.

For example, the embodiments similarly apply to an eye tracking system that uses one camera per user eye, such as in the context of a virtual reality headset or an augmented reality headset. Changes to how the deep learning system is implemented for a one camera per eye tracking should be apparent to one skilled in the art in light of the present disclosure. For example, rather than inputting two warped images, each focusing on one of the user eyes, only a single warped image of the user eye that is associated with the camera is used. Furthermore, no warped image around the user face is may be input. During the training, the neural network learns to predict a distance correction from the warped image rather that predicting this correction based on warped images around the user eyes and around the user face. This system would then output a 2D gaze vector for the user eye associated with the camera and a distance correction for the rough camera-to-eye distance. In addition, in the case of a VR or AR device, a rough distance may be predefined and need not be estimated based on an image generated by the camera.

Figure 5:
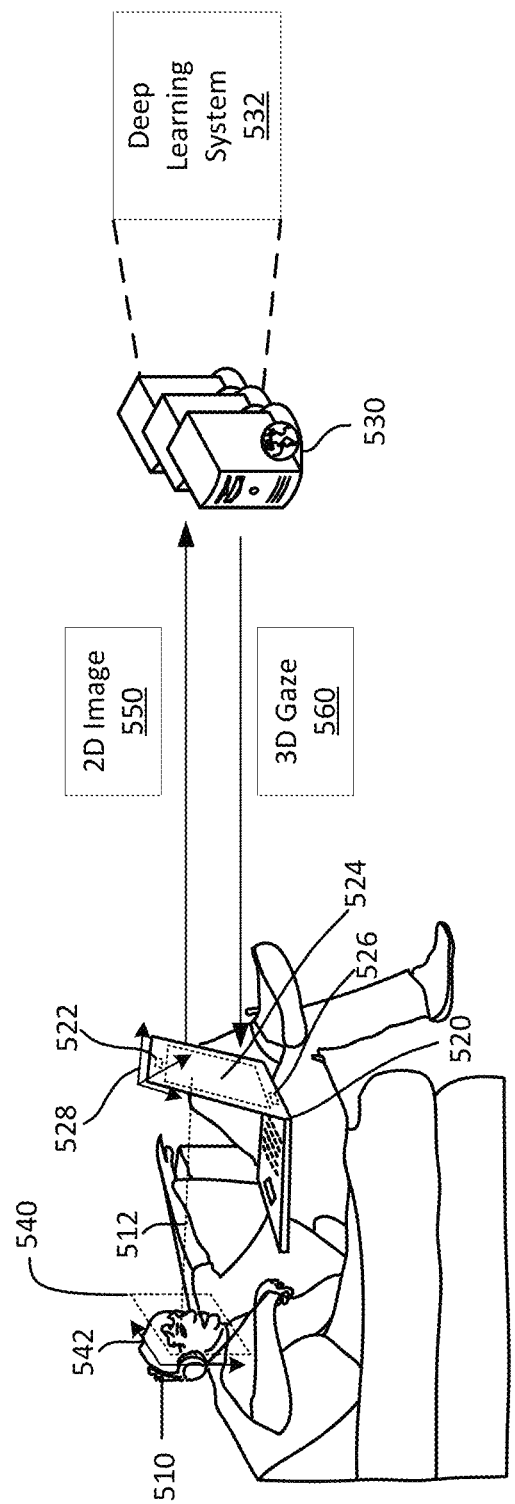
FIG. 5 illustrates an example computing environment for predicting 3D gaze based on a deep learning system, according to an embodiment.

FIG. 5 illustrates an example computing environment for predicting 3D gaze based on a deep learning system, according to an embodiment. Generally, 2D gaze information refers to an X, Y gaze position on a 2D plane. In comparison, 3D refers to not only the X, Y gaze position, but also the Z gaze position. In an example, the 3D gaze can be characterized by an eye position in 3D space as the origin and a direction of the 3D gaze from the origin.

As illustrated in FIG. 5, a user 510 operates a computing device 520 that tracks the 3D gaze 512 of the user 510. To do so, the computing device 520 is, in an example, in communication with a server computer 530 that hosts a deep learning system 532. The computing device 520 sends, to the server computer 530 over a data network (not shown), a 2D image 550 showing the user eyes while the user 510 is gazing. The server computer 530 inputs this 2D image 550 to the deep learning system 532 that, in response, predicts the 3D gaze 512. The server computer 530 sends information 560 about the 3D gaze 512, such as the 3D eye position and 3D gaze direction back to the computing device 520 over the data network. The computing device 520 uses this information 560 to provide a 3D gaze-based computing service to the user 510.

Although FIG. 5 shows the computer server 530 hosting the deep learning system 532, the embodiments of the present disclosure are not limited as such. For example, the computing device 530 can download code and host an instance of the deep learning system 532. In this way, the computing device 520 relies on this instance to locally predict the 3D gaze 512 and need not send the 2D image 550 to the server computer 530. In this example, the server computer 530 (or some other computer system connected thereto over a data network) can train the deep learning system 532 and provide an interface (e.g., a web interface)

for downloading the code of this deep learning system 530 to computing devices, thereby hosting instances of the deep learning system 530 on these computing devices.

In an example, the computing device 520 includes a camera 522, a screen 524, and a 3D gaze application 526. The camera 522 generates the 2D image 550 that is a 2D representation 540 of the user's face. This 2D image 550 shows the user eyes while gazing in 3D space. A 3D coordinate system 528 can be defined in association with the camera 522. For example, the camera 522 is at the origin of this 3D coordinate system 528. The X and Y planes can be a plane perpendicular to the camera's 522 line-of-sight. In comparison, the 2D image 550 has a 2D plane that can be defined around a 2D coordinate system 542 local to the 2D representation 540 of the user's face. The camera 522 is associated with a mapping between the 2D space and the 3D space (e.g., between the two coordinate systems 542 and 528). In an example, this mapping includes the camera's 522 back-projection matrix and is stored locally at the computing device 522 (e.g., in storage location associated with the 3D gaze application 526).

The screen 524 may, but need not be, in the X, Y plane of the camera 522 (if not, the relative positions between the two is determined based on the configuration of the computing device 520). The 3D gaze application 526 can process the 2D image 550 for inputting to the deep learning system 530 (whether remote or local to the computing device 520) and can process the information 560 about the 3D gaze to support stereoscopic displays (if also supported by the screen 524) and 3D applications (e.g., 3D controls and manipulations of displayed objects on the screen 524 based on the information 560).

Figure 6:
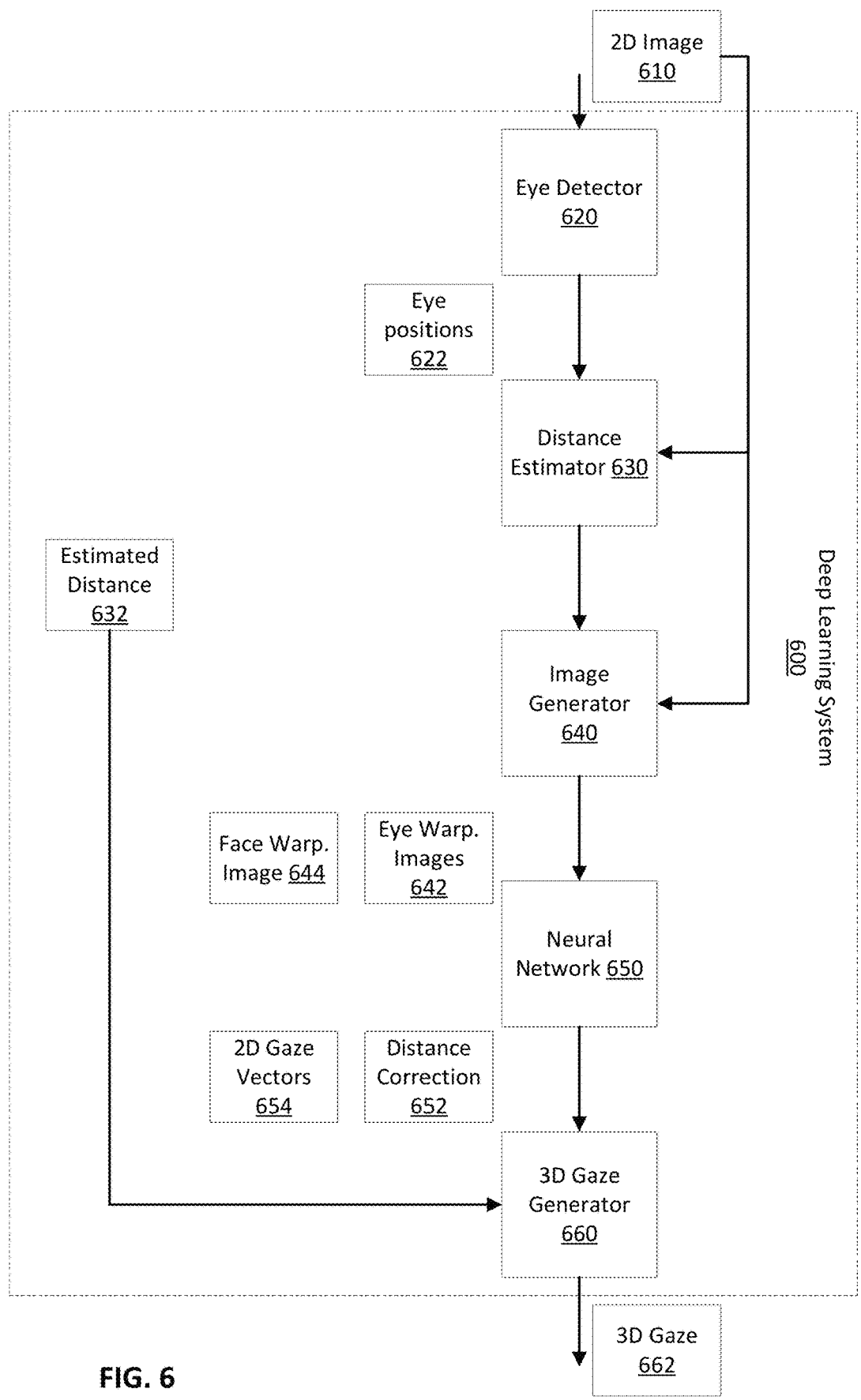
FIG. 6 illustrates example components of a deep learning system for predicting 3D gaze, according to an embodiment.

FIG. 6 illustrates example components of a deep learning system 600 for predicting 3D gaze, according to an embodiment. As illustrated, the deep learning system includes an eye detector 620, a distance estimator 630, an image generator 640, a neural network 650, and a 3D gaze generator 660. Some or all these components can be implemented as specialized hardware and/or as software modules (e.g., specific computer-readable instructions) hosted on specialized or general processing hardware.

As illustrated, a 2D image 610 is input to the eye detector 620. For example, this 2D image 610 is generated with a camera. In response, the eye detector 620 detects the user eyes in the 2D image 610 and outputs information about the positions 622 of the eyes in the image (e.g., locations of these centers of the pupils in the 2D plane of the 2D image 610). In an example, the eye detector 620 is implemented as a machine learning algorithm trained for eye detection. Many machine learning algorithms are possible and are known to one skilled in the art.

The eye positions 622 and the 2D image 610 are input to the distance estimator 630. In response, the distance estimator 630 generates an estimated distance 632, such as a rough distance. To do so, the distance estimator 630 projects the eyes detected in the 2D image 610 into a 3D coordinate system centered around the camera. This projection uses the 2D-3D space mapping of the camera. The distance estimator 630 searches for the eye projections in the 3D space where interocular distance (ID) is about the average human ID (e.g., sixty-three millimeters). The distance between the camera and each of these eye projections can be referred to as a projected distance. The rough distance is set as a function of the average human ID and the projected distances.

Figure 8:
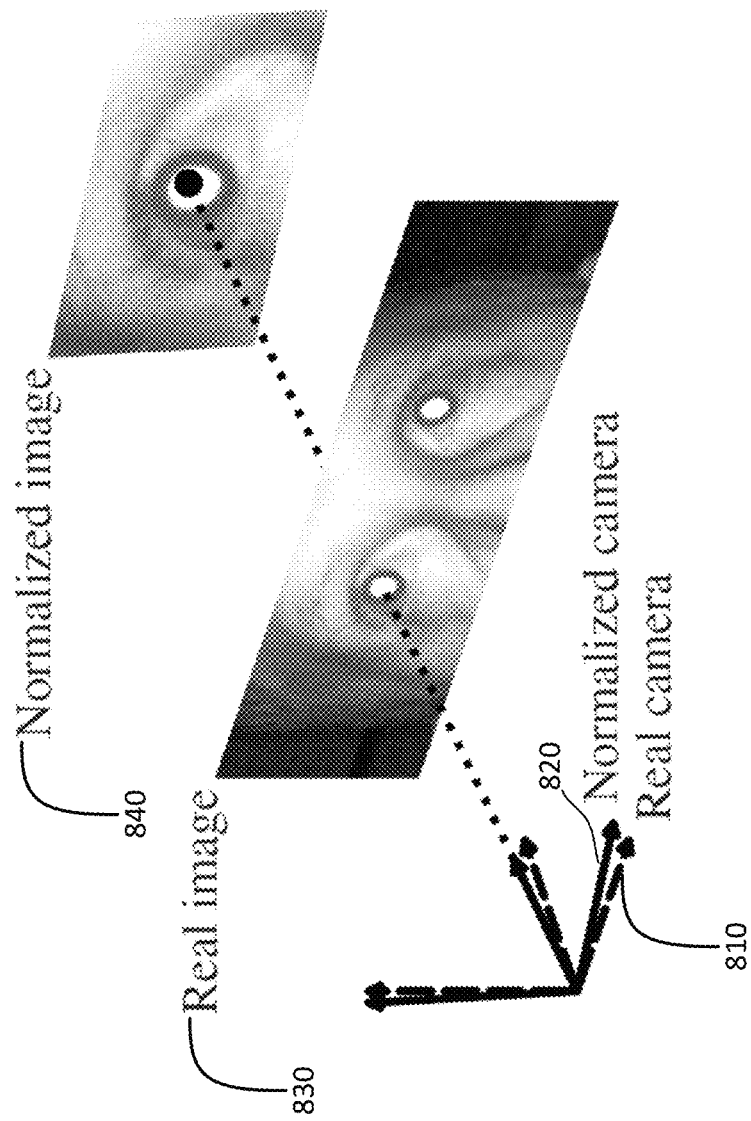
FIG. 8 illustrates an example image normalization, according to an embodiment.

To illustrate, let $d_{rough}$ refer to the rough distance and K to the intrinsic camera matrix, and $e_{left}$ and $e_{right}$ the detected eyes in the 2D image 610. K is a component of the camera's 2D-3D space mapping. The projected left and right eyes $e_{left,proj}'$ and $e_{right,proj}'$ are computed as $e_{left,proj}'=K^{-1}e_{left}$ and $e_{right,proj}'=K^{-1}e_{right}$ and represent eye vectors projected from detected eyes in the 2D image 610 into the 3D coordinate system centered around the camera, as shown in FIG. 8. These projected eyes are normalized as $e_{left,proj}=e_{left,proj}'/\|e_{left,proj}'\|$ and $e_{right,proj}=e_{right,proj}'/\|e_{right,proj}'\|$. The rough distance is computer as $d_{rough}=ID/\|e_{left,proj}-e_{right,proj}\|$.

The image generator 640 receives the 2D image 610 and, in response, generates warped images 642 around the user eyes and a warped image 644 around the user face. In an example, the image generator 640 accesses from local memory a first predefined distance s in pixels for the user eye warped images 642 and a second predefined distance s in pixels for the user face warped image 644. These predefined distances s are different interocular distances in pixels s, such that the user eye warped images 642 and the user face warped image 644 are at different projections in the 3D space and have different resolution (the resolution of the user eye warped images 642 being higher than the one of the user face warped image 644 by using a smaller first predefined distance s relative to the second predefined distance s). The image generator 640 uses these predefined distances s to generate the warped images such that they are normalized relative to the camera. In particular, each warped image represents a projection of the 2D image 610 in the 3D coordinate system centered around the camera, a rotation of the 2D image 610 around the X-axis (such that any head tilt is rotated to be in the horizontal position), a scaling of the 2D image 610 (based on the predefined distances s), and a warping (such that the user eyes and the user face are at the center of each warped image and are not geometrically skewed). In other words, each warped image represents a normalized image that can be input to the neural network 650, where the normalization decouples the dependency of this input to the camera configuration (e.g., image resolution, focal length, distance to a screen, camera type such as pinhole and non-pinhole, and the like).

To illustrate, the image generator 640 generates a rotation matrix R that rotates points from the real 3D space (e.g., the 3D coordinate system centered around the camera) to a normalized 3D space (e.g., a 3D coordinate system also centered around the camera but rotated relative to the 3D real space such that the vector between the user eyes in the 2D image 610 is horizontal), as further shown in FIG. 8. The image generator 640 also generates a scaling matrix M based on a predefined distance s (a matrix M is generated for the user eyes and another matrix M is generated for the user face). For example, M is generated as a diagonal matrix, where M=dig([1,1, f]), where f is a focal length selected to make the interocular distance between the users eyes to be equal to the predefined distance s. A transformation T is defined as a function of the intrinsic matrix K, the rotation matrix R, and the scaling matrix M and is used to normalize the 2D image 610 into a normalized image (for the user eye and for the user face depending on the M matrix). For example, the transformation T is expressed as $T=MRK^{-1}$ and is applied to the 2D image 610 to generate a first normalized image at the first predefined distance s for the user eyes and a second normalized image at the second predefined distance s for the user face. Each of these normalized images is a rotation and a projection of the 2D image 610 from the real 3D space to the normalized 3D space, where the rotated and projected image is at the predefined distance s in the normalized 3D space. The image generator 640 generates a user eye warped image 642 by warping the normalized user eye image using bilinear interpolation and crop out a W×H region centered around one of the user eyes. Similarly, the image generator 640 generates the user face warped image 644 by warping the normalized user face image using bilinear interpolation and crop out a W×H region centered around the middle point between the user eyes.

Furthermore, one of the eye warped images 642 is mirrored such that the resulting mirrored image aligns with the other (un-mirrored) eye warped image. For example, the warped image around the left eye is mirrored. As a result, the inner canthus of the left eye aligns with the inner canthus of the right eye, and the outer canthus of the left eye aligns with the outer canthus of the right eye, as shown in the mirrored left eye image and warped right eye image in FIG. 10. By having this alignment, the eye warped image input to the neural network is the same in terms of orientation, thereby simplifying the architecture and the training of the neural network.

The eye warped images 642 and the face warped image 644 are input to the neural network 650. In an example, the 2D image 610 is not input to this network 650. In response, the neural network 650 outputs a distance correction 652 and 2D gaze vectors 654 (one per eye). The distance correction 652 is a multiplicative correction factor that can multiplied with the estimated distance 632 to correct this estimate and generate a corrected distance. Each of the 2D gaze vectors 654 has a gaze origin (e.g., the center of the pupil or a glint) and a gaze direction in the corresponding eye cropped image (the origin and direction are in the 2D plane of this image and can be traced back to the real 3D space).

Figure 7:
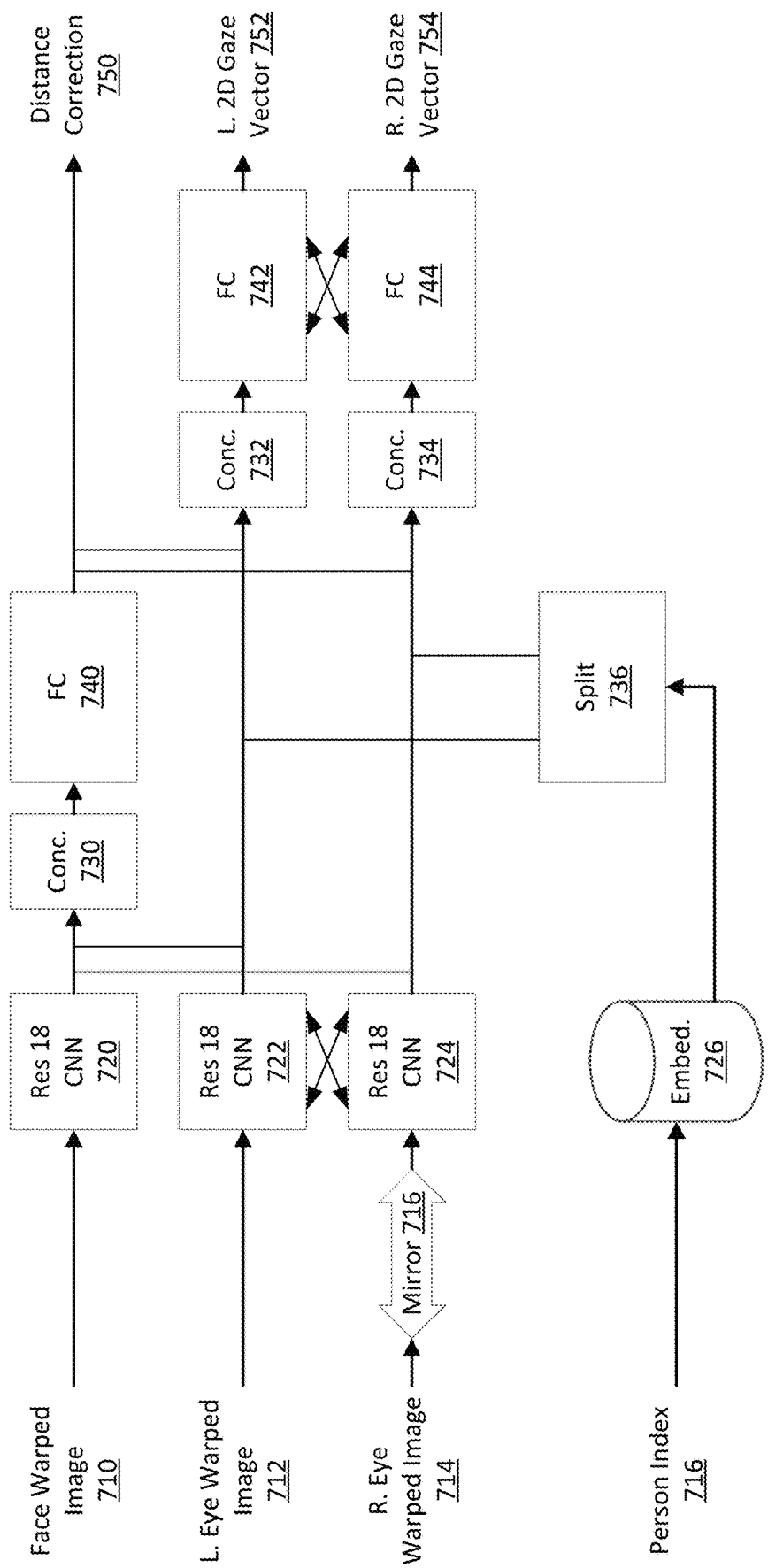
FIG. 7 illustrates an example network architecture for a neural network, according to an embodiment.

In an example, the neural network 650 is a convolutional neural network that includes multiple subnetworks (e.g., along parallel branches of the neural network 650). These subnetworks (and, equivalently, the whole convolutional neural network) can be trained in conjunction. Example of a network architecture is illustrated in FIG. 7. Examples of the training are further described in connection with FIGS. 12 and 13. Each of the warped eye images 642 is input to a subnetwork. These images 642 can be input in conjunction (e.g., the two images as parallel inputs) or separately from each other (e.g., one image input at a time, where the first subnetwork would predict the gaze direction from that image). In response, the subnetwork generates a 2D gaze vectors 654 per eye (e.g., corresponding to the user eye shown in the input image). Each 2D gaze vector can be expressed as a 2D gaze origin $o_{2D}$ (e.g., the user eye 2D location in the image plane) and a 2D gaze direction $d_{2D}$. The face warped image 644 is also input to a subnetwork that, in response, the distance correction c 652. Hence, the output from the neural network includes five components: a 2D gaze origin $o_{2D}$ and a 2D gaze direction $d_{2D}$ per eye and a distance correct c.

The distance correction 652, the estimated distance 632, and the 2D gaze vectors 654 are input to the 3D gaze generator 660. In response, the 3D gaze generator 660 generates and outputs a 3D gaze 662. In an example, the 3D gaze 662 includes a 3D gaze direction per user eye (which can be expressed in the 3D real space) and a 3D position of the user eye (which can also be expressed in the 3D real space).

To illustrate, a corrected distance $d_{corr}$ is generated as $d_{corr}=d_{rough} \times c$. Referring to one of the eyes and its 2D gaze vector, the 3D gaze generator 660 computes its 3D gaze based on the corrected distance and the 2D to 3D space mapping (e.g., the relevant matrices). For instance, the 3D gaze origin $o_{3D,N}$ in the normalized 3D space is computed as $o_{3D,N}'=M^{-1}o_{2D}$ and $o_{3D,N}=o_{3D,N}'/\|o_{3D,N}'\|d_{corr}$. To generate the 3D gaze direction in the normalized 3D space, a normalized basis vector (X,Y,Z) is generated first, where $Z'=M^{-1}o_{2D}$, $Y'=[0,1,0]^T \times Z'$, and $X'=Y' \times Z'$ and $X=X'/\|X'\|$, $Y=Y'/\|Y'\|$, and $Z=Z'/\|Z'\|$. A normalized 3D gaze direction $d_{3D,N}$ is generated as $d_{3D,N}'=[X,Y]d_{2D}-Z$ and $d_{3D,N}=d_{3D,N}'/\|d_{3D,N}'\|$. The 3D gaze original and the 3D gaze direction are mapped from the normalized 3D space to the real 3D space based on the rotation matrix R. For instance, the 3D gaze origin $o_{3D}$ in the real 3D space is computed as $o_{3D}=R^{-1}o_{3D,N}$. Similarly, the 3D gaze direction $d_{3D}$ in the real 3D space is computed as $d_{3D}=R^{-1}d_{3D,N}$.

FIG. 7 illustrates an example network architecture for a neural network, according to an embodiment. As illustrated in FIG. 7, three images 710-714 are input to the network: a face warped image 710 at a low resolution, a left eye warped image 712 at a high resolution, and a right eye warped image 714 at the high resolution (where, "low" and "high" are relative term, such as "low resolution" refers to being lower than the "high resolution"). The eye warped images 712 and 714 are centered on the eye detections, $x=e_{left\ or\ right}$ scaled to an interocular distance of s=320 pixels and cropped to 224×112 pixels. The right eye image 714 is mirrored 716 by modifying the rotation matrix R. This provides the network with a consistent appearance. The face warped image 710 is centered on the midpoint between the eye detections, scaled to=84 pixels and cropped to 224×56 pixels.

The network includes separate convolutional neural networks (CNNs) 720-726 for the eyes (shown as CNN 722 for the left eye and CNN 724 for the right eye, with tied weights) and the face (shown as CNN 720). Both are the convolutional part of ResNet-18, similarly to what is described in K. He, X. Zhang, S. Ren, and J. Sun. "Deep residual learning for image recognition," CoRR, abs/1512.03385, 2015, the content of which is incorporated herein by reference. The output from all CNNs, 720-726 both eyes and the face, are concatenated through as a concatenation layer 730 and fed to a fully connected module 740, which predicts a distance correction c.

The output from each eye CNN 722 and 724 is concatenated with a set of "n" personal calibration parameters and the distance correction c. The concatenation for the left eye and the right eye is through a concatenation layer 732 and a concatenation layer 734, respectively. The combined feature vector resulting from each concatenation is fed to a fully connected module (shown as a fully connected module 742 for the left eye and a fully connected module 744 for the right eye).

The fully connected modules 720-724 can be described as: FC(3072)-BN-ReLU-DO(0.5)-FC(3072)-BN-ReLU-DO(0.5)-FC({4, 1}). The final output is either the 2D gaze origin and 2D gaze direction, or the distance correction c.

The "n" calibration parameters need not be provided to the distance estimation component (e.g., the concatenation layer 739), as it is typically challenging to detect distance errors from calibration data collected at one distance, which is what is typically available.

The network is trained to minimize the mean minimum miss-distance between the predicted gaze lines and the ground-truth stimulus points as illustrated in the next figures. Gaze origins that are outside the eye images and distance correction over forty percent in either direction are also penalized.

FIG. 8 illustrates an example image normalization, according to an embodiment. As illustrated, a real 3D space 810 is centered around a camera that generates a real image 830. The 3D space 810 can be defined as a 3D coordinate system. A normalized 3D space 820 is also centered around the camera and is generated from the real 3D space 810 based on a rotation matrix R. For example, the normalized 3D space 820 corresponds to a rotation of the real 3D space 810 along one of the axis (e.g., the Y axis) of the real 3D space 810. The centers between the user eyes form a line. That line is parallel to an axis in the normalized 3D space 820 (e.g., the X axis). A normalized image 840 (shown as corresponding to a left eye warped image) is projected from the real image 830 in the normalized 3D space (shown as being at a distance away from and parallel to the real image 830). In the case where this normalized image 840 corresponds to location where the interocular distance between the two eyes is the average human ID of 63 mm, the distance between the camera and the center of the eye in the normalized image 840 is the rough distance.

Figure 9:
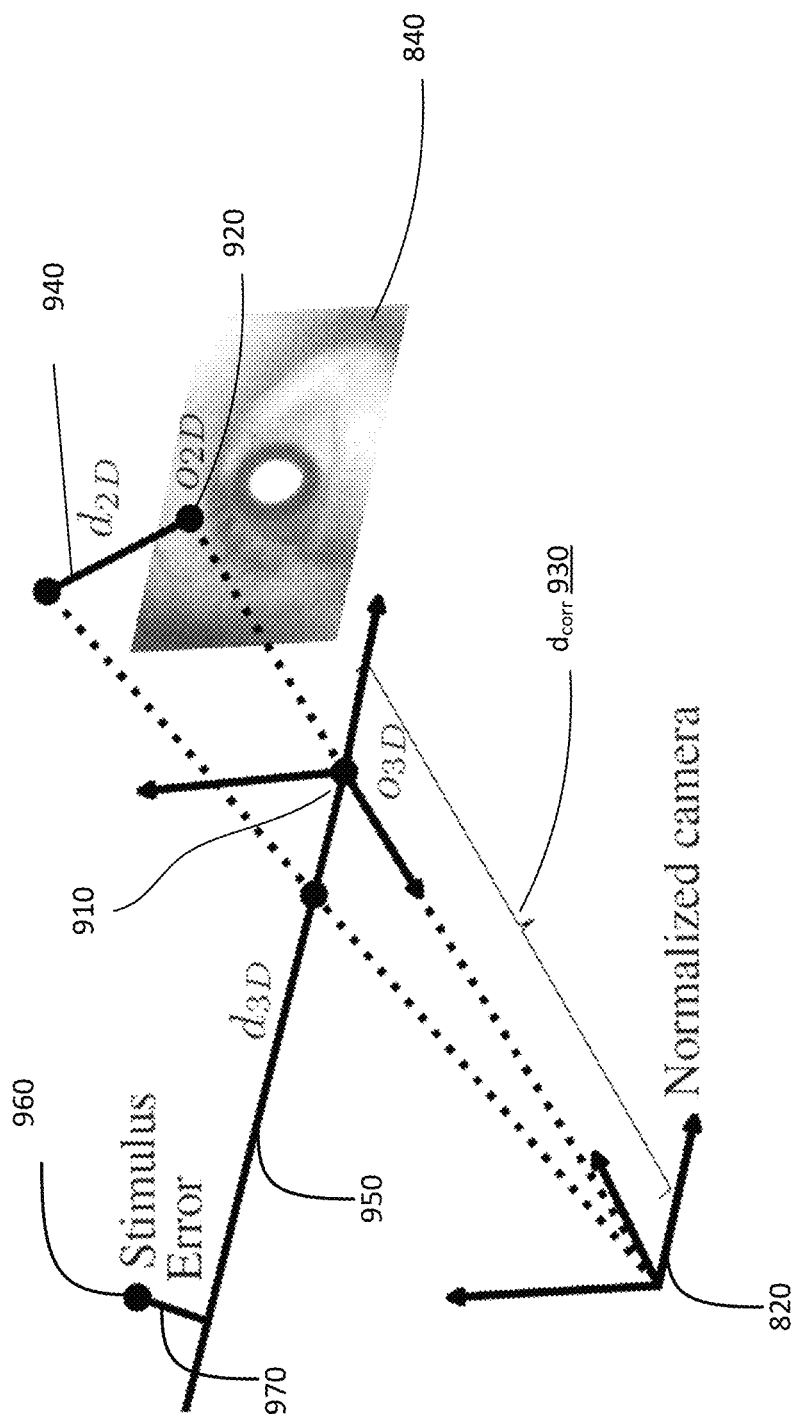
FIG. 9 illustrates an example 3D gaze prediction, according to an embodiment.

FIG. 9 illustrates an example 3D gaze prediction, according to an embodiment. As illustrated, the normalized 3D space 820 of FIG. 8 is used, although the prediction can be mapped to the real 3D space 810 by using the inverse of the rotation matrix R as described in connection with FIG. 6. A 3D gaze origin 910 is derived from a 2D gaze origin 920 based on the inverse of a scaling matrix M and a corrected distance 930. The 2D gaze origin 920 and a 2D gaze direction 940 represent a 2D gaze vector in the plane of the normalized image 840. A 3D gaze direction 950 is derived from the 2D gaze origin 920 and the 2D gaze direction 940 based on the inverse of the scaling matrix M as described in connection with FIG. 6.

During training, a 3D gaze line (or 3D gaze ray) is projected from the 3D gaze origin 910 along the 3D gaze direction 950. A stimulus point 960 for the gaze is known (e.g., a known gaze point). The distance 970 (e.g., the shortest distance) between the stimulus point 96 and the 3D gaze line is a distance parameter of the loss function. The loss function is minimized by minimizing this distance 970 (e.g., if the neural network properly predicts the 3D gaze, the distance 970 would be zero and the stimulus point 960 would fall on the 3D gaze line).

Figure 10:
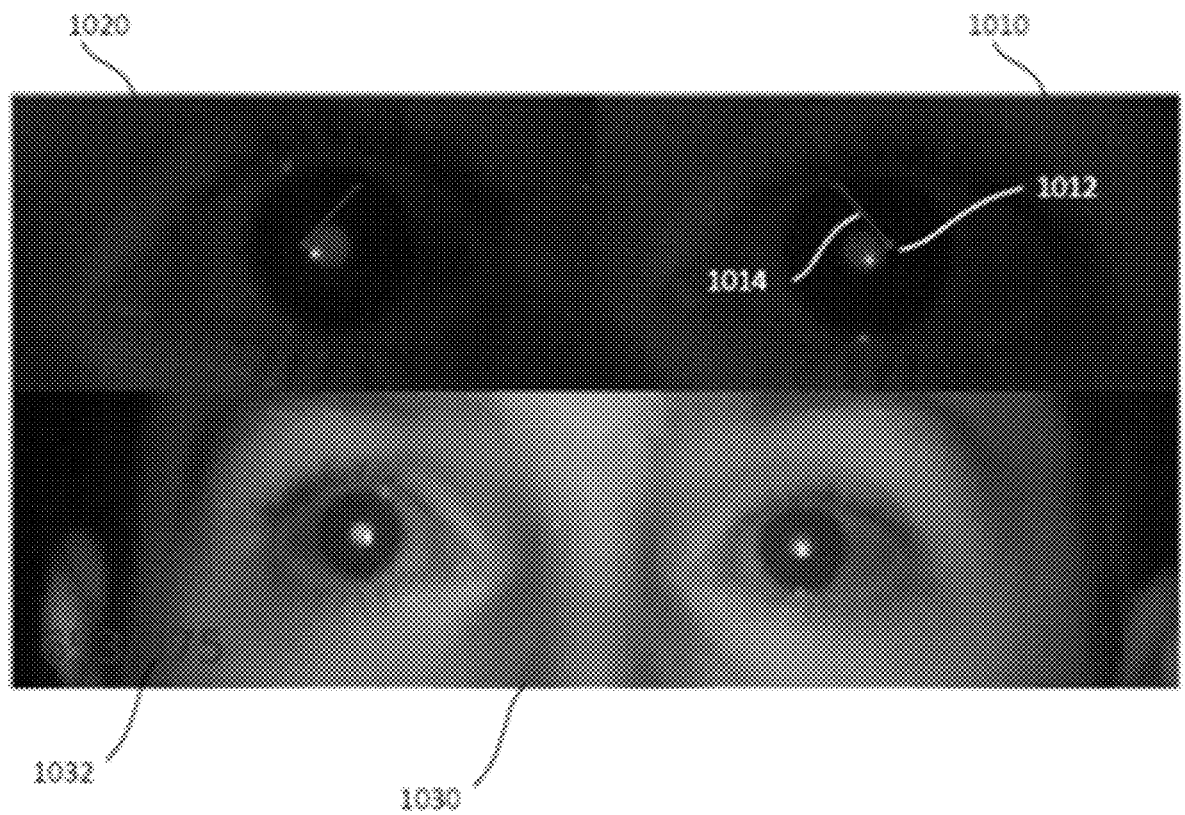
FIG. 10 illustrates predictions for 2D gaze vectors and distance correction generated by a neural network, according to an embodiment.

FIG. 10 illustrates predictions for 2D gaze vectors and distance correction generated by a neural network, according to an embodiment. FIG. 10 shows three images 1010, 1020, 1030 that were input to the neural network. Images 1010 and 1020 are eye warped images, whereas image 1030 is a face warped image. Furthermore, image 1020 (e.g., of the left eye) is mirrored such that the two images 1010 and 1020 are aligned (e.g., the inner canthus of the left eye aligns with the inner canthus of the right eye, and the outer canthus of the left eye aligns with the outer canthus of the right eye).

The predicted 2D gaze vectors are overlaid over the images 1010 and 1020. As shown in the overlay of the image 1010 (and, similarly, in the overlay of the image 1020), the 2D gaze vector has a gaze origin 1012 (e.g., a glint on the right eye) and a gaze direction 1014. The estimated and corrected distances 1032 are overlaid in the image 1030. As shown, the estimated distance is six-hundred fifty-three millimeters and the corrected distance is four-hundred seventy-five millimeters, representing a predicted distance correction of about seventy-two percent.

Figure 11:
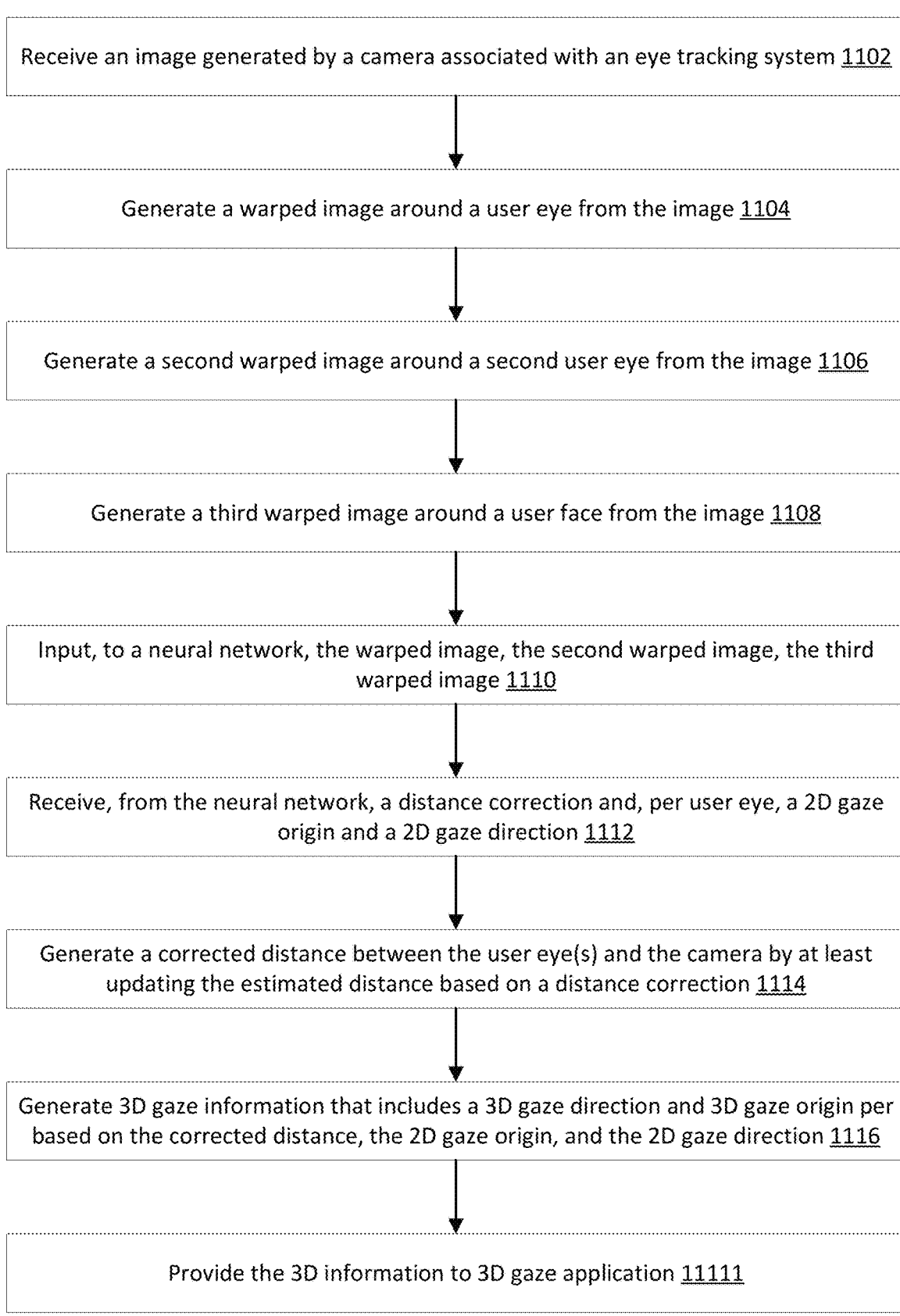
FIG. 11 illustrates an example flow for predicting 3D gaze based on a deep learning system, according to an embodiment.

FIG. 11 illustrates an example flow for predicting 3D gaze based on a deep learning system such as the deep learning system 600, in accordance with an embodiment. An eye tracking system is described as performing the operations of the example flow. In an example, the eye tracking system hosts the deep learning system. In another example, a remote computer system hosts the deep learning system and the eye tracking system interacts with this remote computer system over a data network to provide a 2D image and receive a 3D gaze prediction. In yet another example, the deep learning system is distributed between the eye tracking system and the remote computer system (e.g., the remote computer system may host the neural network while the eye tracking system may host the remaining component of the deep learning system).

Instructions for performing the operations of the illustrative flow can be stored as computer-readable instructions on a non-transitory computer-readable medium of the eye tracking system. As stored, the instructions represent programmable modules that include code or data executable by a processor(s) of the eye tracking system. The execution of such instructions configures the eye tracking system to perform the specific operations shown in the figure and described herein. Each programmable module in combination with the processor represents a means for performing a respective operation(s). While the operations are illustrated in a particular order, it should be understood that no particular order is necessary and that one or more operations may be omitted, skipped, and/or reordered.

The example flow starts at operation 1102, where the eye tracking system receives an image (e.g., a 2D image). In an example, the image is generated by a camera associated with the eye tracking system (e.g., a camera integrated or interfacing with such a system). The image shows a user eye (e.g., when the camera is associated with two user eyes, the image shows both eyes; when the camera is associated with one user eye as in the case of a VR headset, the image shows only that user eye).

At operation 1104, the eye tracking system generates a warped around the user eye from the image. For example, the eye tracking system detects the user eye in the image and estimates a rough distance between the camera and the user eye as detected in the image. The eye tracking system also projects the image in a 3D space based on an intrinsic matrix K of the camera, rotates the projected image based on a rotation matrix R, and scales the rotated image based on a scaling matrix M. The scaling matrix M is generated based on predefined distance s in pixels and the average human interocular distance. The eye tracking system then warps the scaled image using bilinear interpretation crops the warped image around the user eye based on a predefined region (e.g., one having predefined width and height). This image has a first image resolution that depends on the predefined distance s.

At operation 1106, the eye tracking system generates a second warped image around a second user eye from the image. This operation is performed if the image shows the second user eye and is, otherwise, skipped. Operation 1106 is similar to operation 1104. The second warped image shows the second user eye and has the first image resolution.

At operation 1108, the eye tracking system generates a third warped image around the user from the image. This operation is also performed if the image shows the second user eye and is, otherwise, skipped. Operation 1106 is similar to operation 1104, where the scaling is based on a second predefined distance s (and, thus, a second scaling matrix M) to achieved a second image resolution. The third warped image shows the user face or at least both user eyes and has the second image resolution lower than the first image resolution.

At operation 1110, the eye tracking system inputs to a neural network the warped image of the user eye. If the other two warped images (e.g., of the second user eye and the user face) are generated, they are also input to the neural network. The neural network is already trained and predicts (i) a distance correction c and (ii) a 2D gaze origin and a 2D gaze direction per eye in the associated warped eye image. Generally, the distance correction c is used to correct the estimated rough distance and is predicted based on the warped image and, if available, the second and third warped images. The 2D gaze origin and the 2D gaze direction for the user eye (and, similarly, for the second user eye) is generated from the warped image (and, similarly, from the second warped image) separately from the second and third warped images (and, similarly, separately from the warped and third warped images).

In an example, the neural network is also trained based on "n" calibration parameters that become embedded in the neural network. During a calibration of the eye tracking system, this system generates a plurality of calibration images by instructing the user to gaze at known gaze points. The calibration images are also normalized and warped and are input to the neural network. The "n" calibration parameters are adjusted such that the loss function of the neural network is minimized. This minimization uses the known gaze points as ground truth. Once the image is received by the eye tracking system at operation 1102 and processed through operations 1106-110, the prediction of the neural network at operation 1110 uses the "n" calibration parameters.

At operation 1112, the eye tracking system receives from the neural network the distance correction c. The eye tracking system also receives from the neural network the 2D gaze origin and 2D gaze direction for the user eye and, as applicable, the 2D gaze origin and 2D gaze direction for the second user eye.

At operation 1114, the eye tracking system generates a corrected distance between the user eye and the camera by at least updating the estimated rough distance based on the distance correction c. For example, the distance correction c is a correction factor and the eye tracking system multiplies the estimated rough distance by this factor to generate the corrected distance.

At operation 1116, the eye tracking system generates 3D gaze information for the user eye from the corrected distance and its 2D gaze origin and 2D gaze direction. The 3D gaze information includes a position in the 3D space of the user eye (e.g., 3D gaze origin) and a 3D gaze direction originating from the user eye. In an example, the 3D gaze origin and 3D gaze direction are derived from the corrected distance, the 2D gaze origin, and the 2D gaze direction based on the scaling matrix M and the rotation matrix R (or their inverse). This operation can also be repeated to generate a 3D gaze origin and a 3D gaze direction for the second user eye based on the corrected distance and its 2D gaze origin and 2D gaze direction. In this case, the 3D gaze information includes the 3D gaze origins and 3D gaze directions of the two user eyes.

At operation 1120, the eye tracking system provides the 3D gaze information generated for the user eye and, as applicable, the 3D gaze information generated for the second user eye to a 3D gaze application. The 3D gaze application uses the 3D gaze information to support stereoscopic displays and 3D applications (e.g., 3D controls and manipulations of displayed objects on a screen).

A neural network of a deep learning system is trained based on training images to predict a distance correction and a 2D gaze vector (e.g., 2D gaze origin and 2D gaze direction) per user eye. Generally, the training is iterative across the training images to minimize a loss function and, accordingly, update the parameters of the neural network through back-propagation (e.g., one that uses gradient descent). Because the neural network should predict two outputs (the distance correction and the 2D gaze vector), relying on training images showing user eyes while gazing at gaze points within 2D planes of the associated cameras that captured these images is insufficient. Instead, diversity of the locations of gaze points relative to the 2D planes is needed for proper training. This issue in the training and solution are further described in connection with FIG. 12.

Figure 12:
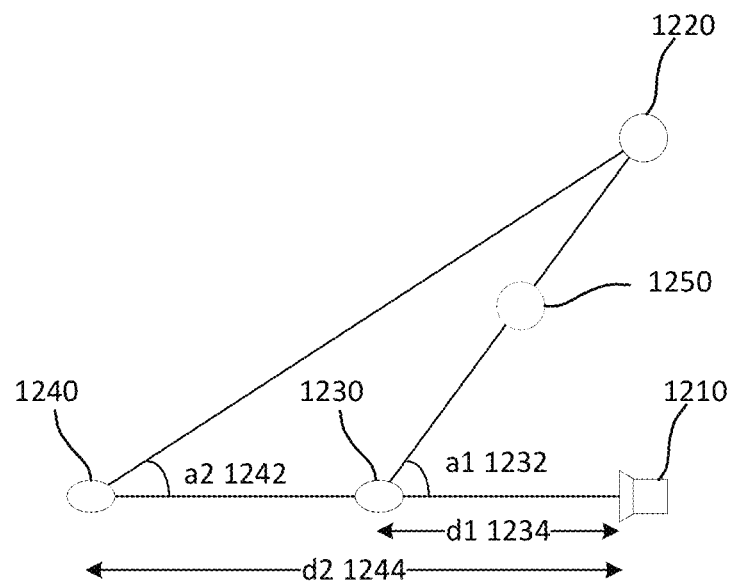
FIG. 12 illustrates a strategy for using training images that are associated with a diversity of gaze point locations relative to 2D planes of cameras that generated the training images, according to an embodiment.

FIG. 12 illustrates a strategy for using training images that are associated with a diversity of gaze point locations relative to 2D planes of cameras that generated the training images, according to an embodiment. In the interest of clarity of explanation, a single user eye is referred to in connection with FIG. 12. However, training images that show two user eyes are equally applicable. The user eyes captured in the training images are also referred to herein as "shown user eyes." The cameras used to generate the training images are also referred to herein as "training cameras." As illustrated, a camera 1210 generates training images that show a user eye. Each training image is a 2D image captured while the user eye was gazing at a gaze point.

For example, a first training image shows the user while gazing at a gaze point 1220. If that first training input was an input to the neural network during its training, the neural network may incorrectly find the gaze direction of the user eye to the gaze point 1220 and the distance of the user eye to the camera 1210. As illustrated in FIG. 12, there may be multiple solutions for the gaze direction and distance (FIG. 12 shows two of these solutions). In a first solution, the neural network can predict that the user eye (shown as element 1230 in this solution) is gazing at a first angle "a1" 1232 relative to the gaze point 1220 and is at a first distance "d1" 1234 to the camera 1210. In a second solution, the neural network can predict that the user eye (shown as element 1240 in this solution) is gazing at a second angle "a2" 1242 relative to the gaze point 1220 and is at a second distance "d2" 1244 to the camera 1210. Both solutions are possible, but only one is correct. Hence, the neural network can predict the incorrect solution, thereby the training would not be proper and would result in a trained neural network that generated inaccurate predictions.

To avoid this potential, a strategy for gaze point location diversity is used. Under this strategy, a second training image of the user eye is additionally used. In this second training image, either the gaze angle or the user eye-to-camera distance changes. Accordingly, when both training images are used, the set of possible solutions is reduced to a single solution (e.g., either the first solution or the second solution in the above example).

Different ways are possible to achieve this diversity. Generally, the training images can include two sets of training images. The first set is for training images of user eyes gazing at gaze points within the 2D planes of the cameras. The second set is for training images of user eyes gazing at gaze points outside of the 2D planes of the cameras. In this way, when the various training images are input to the neural network, the neural network learns to find the correct solutions.

FIG. 12 illustrates one specific way. As illustrated, the second training image is generated for the user eye while it is gazing a second gaze point 1250 along the same gaze angle as in the first training image. In this way, the only possible solution is the first solution (e.g., the first angle "a1" 1232 and the first distance "d1" 1234). Another way is to use the same gaze point 1220 for the second training image, but change the distance between the user eye to the camera 1210 (e.g., by moving the camera closer or farther from the user eye while the user eye maintains its gaze on the gaze point 1220). Yet another way is to maintain the same user eye-to-camera distance, introduce a second gaze point (not necessarily at the same gaze angle as in the specific way illustrated in FIG. 12) and generate the second training image while the user eye is gazing at that second gaze point. Of course, a combination of these different ways can be used to generate multiple training images for different user eyes, different gaze angles, and different user eye-to-camera distances. The same camera (or camera configuration for multiple camera) may, but need not, be used to generate the training images because the training does not depend on a specific camera or screen configuration.

Once the training images are generated, they are input to the neural network for the training. In particular, the neural network predicts the gaze angles and the user eye to-camera distances from these training images. The loss function can be defined based relative to gaze angles and user eye to-camera distances. In the interest of clarity, consider the first training image described herein above (e.g., generated when the user eye was gazing at the gaze point 1220). Based on that training image (and the second training image), the neural network predicts the first solution (e.g., the first angle "a1" 1232 and the first distance "d1" 1234). Let us assume that the first angle "a1" 1232 and the first distance "d1" 1234 are the actual gaze angle and distance, which are known in the training (e.g., they are ground truth measurements that can be stored in a training label associated with the first training image). Let us also assume that the prediction is not completely accurate (e.g., the predicted angle deviates from the first angle "a1" 1232 and the predicted distance deviates from the first distance "d1" 1234). The loss function includes a distance term and an angle term. The distance term is the difference between the predicted distance and the ground truth distance (e.g., the actual first distance "d1" 1234). The angle term is the difference between the predicted gaze angle and the ground truth gaze angle (e.g., the actual first angle "a1" 1232). The goal of the training is to update the parameters of the neural network such that its loss function is minimized, where minimizing the loss function includes minimizing the angle term and the distance term such that the predicted angle is as close as possible to the ground truth angle and the predicted distance is as close as possible to the ground truth distance.

In an example, this angle term and the distance term can be replaced with a single distance term. For instance, a predicted gaze line is generated at the predicted distance away from the camera and has the predicted gaze angle. The distance (e.g., the shortest distance) between the gaze point 1220 and the predicted gaze line is measured (this is shown in FIG. 9 as the distance 970). If the prediction was completely accurate, this gaze point-to-predicted gaze line distance would be zero. However in other cases, the loss function is minimized (and the neural network parameters are updated), by minimizing the gaze point-to-predicted gaze line distance such that the predicted gaze line is as close to the gaze point 1220 as possible.

In this example also, the loss function can include a penalty term. More specifically, when an origin of a predicted gaze line falls outside the corresponding training image (e.g., referring back to the above example, if "d1" 1234 is large enough such that the eye 1230 would be outside the first training image), a penalty is added to the loss function (e.g., the penalty has a predefined value). Likewise, if a predicted distance correction is over a certain threshold in either direction (e.g., forty percent in either direction), the same or another penalty is added to the loss function.

Figure 13:
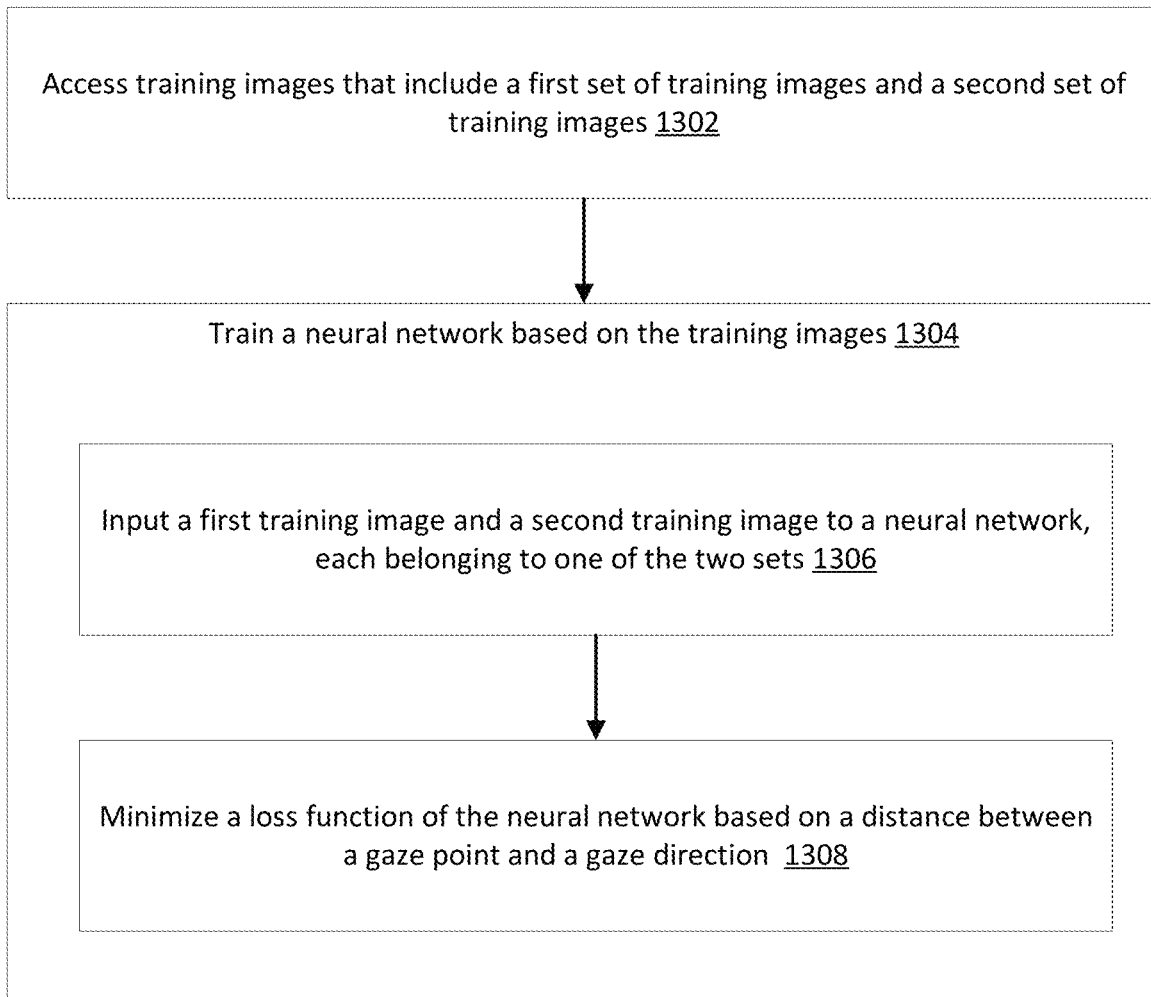
FIG. 13 illustrates an example flow for training a neural network, according to an embodiment.
Figure 14:
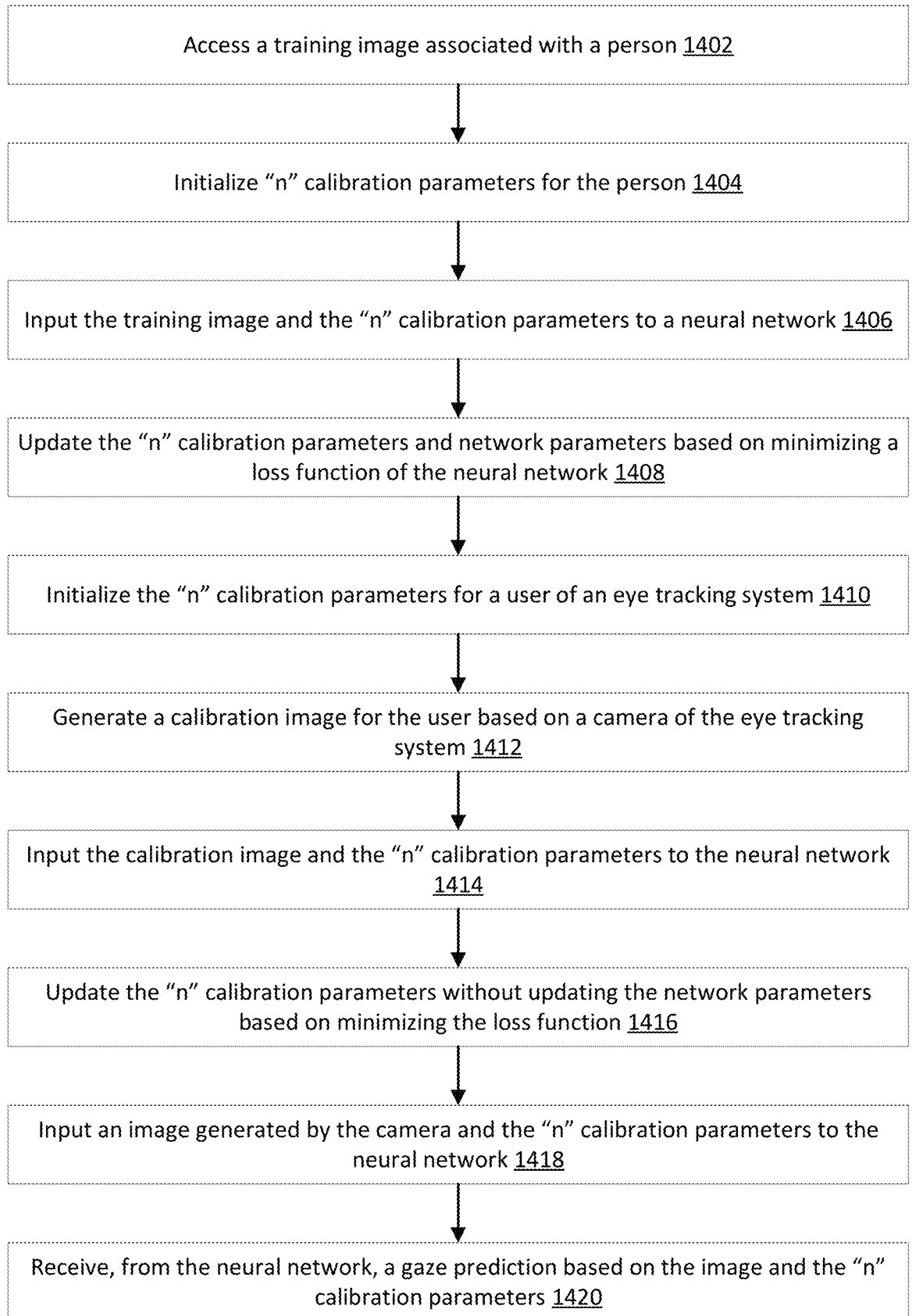
FIG. 14 illustrates an example flow for training a neural network using embedded calibration parameters, according to an embodiment.

FIG. 13 illustrates an example flow for training a neural network, according to an embodiment. FIG. 14 also illustrates an additional example flow for the training, where this training uses embedded calibration parameters according to an embodiments. A computer system is described as performing the operations of the example flows. In an example, the computer system performs the training and stores code of the neural network. Upon completion of the training, the computer system may receive images from eye tracking system and use the neural network to respond with 3D gaze predictions. Additionally or alternatively, the eye tracking systems may download the code of the neural network from the computer system.

Instructions for performing the operations of the illustrative flows can be stored as computer-readable instructions on a non-transitory computer-readable medium of the computer system. As stored, the instructions represent programmable modules that include code or data executable by a processor(s) of the computer system. The execution of such instructions configures the eye computer system to perform the specific operations shown in the figures and described herein. Each programmable module in combination with the processor represents a means for performing a respective operation(s). While the operations are illustrated in a particular order, it should be understood that no particular order is necessary and that one or more operations may be omitted, skipped, and/or reordered.

The example flow of FIG. 13 starts at operation 1302, where the computer system accesses training images that include a first set of training images and a second set of training images. Some or all of the training images in the first set show user eyes associated with gaze points in a plane of a camera. Some or all of the training images in the second set show user eyes associated with gaze points outside the plane of the camera. In this way, diversity of training images showing user eyes gazing at gaze points inside and outside the plane is achieved.

At operation 1304, the computer system trains the neural network based on the training images. Generally, the training includes updating parameters of the neural network (e.g., weights of connections between nodes across layers of the neural network) to minimize a loss function of the neural network. The loss function can use an angle term and/or a distance term as explained herein above in connection with FIG. 12. In an example, operation 1304 includes two additional operations 1306 and 1308.

At operation 1306, the computer system inputs a first training image and a second training image from the training images to the neural network. The first training image belongs to the first set of training images. The second training image belongs to the second set of training images. In a specific example, the first training image shows the user eye while gazing at a gaze point according to a gaze angle and second training image shows the user eye while gazing at another gaze point according to the gaze angle. In another specific example, the first training image and the second training image show the user eye while gazing at the gaze point in a gaze angle. In this example, the first training image corresponds to a first distance between the camera and the user eye, and the second training image corresponds to a second distance between the camera and the user eye. In yet another specific example, the first training image shows the user eye while gazing at the gaze point according to a gaze angle and the second training image shows the user eye while gazing at another gaze point according to a different gaze angle. In these examples, the first and second training images can be input as a pair.

As used herein in connection with the flow of FIG. 13, a training image refers to a set of training images that includes a warped image that shows an eye of a person and, optionally, a warped image of the other eye of the person and a warped image of the face of the person. In other words, the images used in the training are of similar types that the images that would be used upon completion of the training (e.g., as illustrated in connection with FIG. 9) and can be generated following similar operations of projecting, rotating, scaling, and cropping.

At operation 1308, the computer system minimizes the loss function of the neural network based on a distance between a gaze point and a gaze line. The gaze point is associated with one of the first training image or the second training image. The gaze line is predicted by the neural network for a user eye from the one of the first training image or the second training image. Operations 1306-1308 are repeated across many if not all of the training images to complete the training of the neural network.

Turning to FIG. 14, the training of the neural network can also involve calibration parameters, such that when the neural network predicts gaze information (as described herein above), the prediction is based on such parameters. A designer of the neural network and/or an eye tracking system need not specify the calibration parameters. Instead, the calibration parameters are embedded and it is sufficient for the designer to specify the number of these parameters. During the training, the calibration parameters are initialized and then updated along with the parameters of the neural network (e.g., the weights between the connections in the network) based on minimizing the loss function of the neural network. In this way, the parameters of the neural network are updated during the training based on also the calibration parameters. During the training of the neural network, some of the operations of the flow of FIG. 14 can be implemented and used in conjunction with the operations of FIG. 13. Upon completion of the training, remaining operations of the flow of FIG. 14 can be implemented and used in conjunction with the operations of FIG. 11. In this case, the calibration parameters of the user are set based on minimizing the loss function given a set of calibration images. These calibration parameters are then input to the neural network in support of the 3D gaze prediction.

Although FIG. 14 describes learning the calibration parameters within the context of a neural network that predicts gaze information, the embodiments are not limited as such. Generally, the operations of FIG. 14 similarly apply in connection with a neural network that is associated with a system and that is trained for a task (e.g., predicting a particular outcome), where proper operation of the system involves calibration. Furthermore, in the interest of clarity of explanation, the example flow of FIG. 14 is described in connection with a training image, calibration image, and image. However, the example flow similarly apply for multiple training images, multiple calibration images, and multiple images.

As illustrated, the example flow of FIG. 14 starts at operation 1402, where the computer system accesses a training image associated with a person. The training image shows a face and/or an eye(s) of the person. Generally, the person has an index "i" and the training image can also be indexed with index "i" (e.g., the label or metadata data of the training image includes the index "i"). The training image may be available from a data store and accessed therefrom as part of the training process. The number "n" is an integer number greater than zero that a designer of the neural network specifies. In an example, the number "n" is between two and ten. In a specific example, the number "n" is three.

At operation 1404, the computer system initializes "n" calibration parameters for the person. For instance, the values of these calibration parameters are set to zero or some other first value.

At operation 1406, the computer system inputs the training image and the "n" calibration parameters to the neural network. For example, the training image is input to the relevant Res18 CNN of the neural network, while the "n" calibration parameters are input to concatenation layers associated with fully connected modules of the neural network where these modules are responsible for predicting 2D gaze origins and 2D gaze directions.

At operation 1408, the computer system updates the "n" calibration parameters and parameters of the neural network (referred to herein as network parameters and include, for example, weights of connections between nodes of the neural network) based on minimizing a loss function of the neural network. The loss function is minimized based on the training image and the "n" calibration parameters though backpropagation. Accordingly, the first values (e.g., zeros) of the "n" calibration parameters are updated to second values.

Operations 1402-1408 may be implemented as part of training the neural network by the computer system. Upon completion of the training, the neural network may be available for use by a user of an eye tracking system. When using the eye tracking system, this system may be calibrating by calibrating the neural network specifically to the user.

At operation 1410, the computer system initializes the "n" calibration parameters for the user. This operation is similar to operation 1404. In an example, the initialization may, but need not be, to the same first values (e.g., zeros). In another example, the initialization is to the updated values (e.g., the second values) of the "n" calibration parameters as determined under operation 1408.

At operation 1412, the computer system generates a calibration image for the user. For example, the computer system instructs the user to gaze at a known gaze point and generates the calibration image accordingly. The calibration image shows an eye (or two eyes, or a face as application) of the user based on image data generated by a camera associated with the eye tracking system.

At operation 1414, the computer system inputs the calibration image and the calibration parameters to the neural network. This operation is similar to operation 1406.

At operation 1416, the computer system updates the "n" calibration parameters for the user without updating the network parameters that were set during the training. The "n" calibration parameters are updated by at least minimizing the loss function based on the calibration image and the "n" calibration parameters, where the minimization does not change the network parameters. Here, the calibration image has a known calibration point. The known calibration point is used a ground truth for user gaze in the minimization of the loss function. The computer system iteratively updates the "n" calibration parameters while maintaining the network parameters through backpropagation until the loss function is minimized. Accordingly, the initialized values (e.g., the first values) of the "n" calibration parameters as performed under operation 1410 are updated to third values. Typically, the third values are different from the second values of the "n" calibration parameters as determined under operation 1408.

Operations 1410-1416 may be implemented as part of calibrating the neural network by the computer system.

Upon completion of the calibration, the neural network may be available for generating 3D gaze information for the user.

At operation 1418, the computer system inputs an image and the "n" calibration parameters as updated for the user to the neural network. The image shows the eye (the two eyes, or the face as applicable) of the user based on additional image data generated by the camera. This operation is similar to operation 1406.

At operation 1420, the computer system receives a prediction from the neural network based on the image and the "n" calibration parameters. The prediction includes a distance correction, a 2D gaze origin of the eye of the user in the image, and a 2D gaze direction of the eye of the user in the image.

The disclosure has now been described in detail for the purposes of clarity and understanding. However, it will be appreciated that certain changes and modifications may be practiced within the scope of the appended claims.

The above description provides exemplary embodiments only, and is not intended to limit the scope, applicability or configuration of the disclosure. Rather, the above description of the exemplary embodiments will provide those skilled in the art with an enabling description for implementing one or more exemplary embodiments. It being understood that various changes may be made in the function and arrangement of elements without departing from the spirit and scope of the disclosure as set forth herein.

For example, any detail discussed with regard to one embodiment may or may not be present in all contemplated versions of that embodiment. Likewise, any detail discussed with regard to one embodiment may or may not be present in all contemplated versions of other embodiments discussed herein. Finally, the absence of discussion of any detail with regard to embodiment herein shall be an implicit recognition that such detail may or may not be present in any version of any embodiment discussed herein.

Specific details are given in the following description to provide a thorough understanding of the embodiments. However, it will be understood by one of ordinary skill in the art that the embodiments may be practiced without these specific details. For example, circuits, systems, networks, processes, and other elements in the disclosure may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

The term "machine-readable medium" includes, but is not limited to transitory and non-transitory, portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments of the disclosure may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor or processors may perform the necessary tasks.

As used herein, the phrase "a first thing based on a second thing," and the like, may mean that the first thing is based solely on the second thing, or that the first thing is based on the second thing as well as one or more additional things.

What is claimed is:

1. A computer-implemented method for detecting three dimensional (3D) gaze, the computer-implemented method comprising:
   generating, by an eye tracking system based on a two dimensional (2D) image, a warped image centered around a user eye from the 2D image, wherein the 2D image is generated by a camera associated with the eye tracking system;
   inputting, by the eye tracking system to a neural network, the warped image, wherein the neural network predicts a distance correction, a 2D gaze origin of the user eye in the warped image, and a 2D gaze direction of the user eye in the warped image based on the warped image;
   generating, by the eye tracking system, a corrected distance between the user eye and the camera by at least updating an estimated distance based on the distance correction; and
   generating, by the eye tracking system, 3D gaze information for the user eye based on the 2D gaze origin, the 2D gaze direction, and the corrected distance.

2. The computer-implemented method of claim 1, further comprising:
   determining, by the eye tracking system, the estimated distance between the camera and the user eye based on the 2D image; and
   estimating, by the eye tracking system, a position of the user eye in a 3D space based on the corrected distance and on a position of the camera in the 3D space, wherein the 3D gaze information comprises the position of the user eye in the 3D space.

3. The computer-implemented method of claim 2, further comprising:
   estimating, by the eye tracking system, a 3D gaze direction from the position of the user eye in the 3D space based on the 2D gaze origin and the 2D gaze direction, wherein the 3D gaze information comprises the 3D gaze direction.

4. The computer-implemented method of claim 1, wherein generating the warped image comprises normalizing the 2D image to generate a normalized image and cropping the normalized image around the user eye to generate the warped image.

5. The computer-implemented method of claim 1, wherein the 2D image further shows a second user eye and a user face, and further comprising:
   generating, by the eye tracking system, a second warped image around the second user eye from the 2D image;
   generating, by the eye tracking system, a third warped image around the user face from the 2D image; and
   inputting, by the eye tracking system to the neural network, the second warped image and third warped image, wherein the neural network predicts the distance correction further based on the second warped image and the third warped image.

6. The computer-implemented method of claim 5, further comprising:
   generating, by the eye tracking system, a second position of the second user eye in a 3D space and a second gaze direction from the second position in the 3D space based on the corrected distance, and wherein the 3D gaze information comprises the second position and the second gaze direction.

7. The computer-implemented method of claim 6, wherein the second warped image is a mirrored image around the second user eye.

8. The computer-implemented method of claim 5, wherein the warped image and the second warped image are generated at a first image resolution, and wherein the third warped image is generated at a second image resolution that is smaller than the first image resolution, wherein the second image resolution is lower than the first image resolution, wherein the first image resolution is based on a first predefined distance associated with projecting the warped image and the second warped image in a 3D gaze space, and wherein the second image resolution is based on a second predefined distance associated with projecting the third warped image in the 3D gaze space.

9. The computer-implemented method of claim 5, wherein the neural network further predicts a second 2D gaze origin and a second 2D gaze direction of the second user eye in the second warped image based on the warped image and the second warped image.

10. The computer-implemented method of claim 5, wherein the neural network further predicts a second 2D gaze origin and a second 2D gaze direction of the second user eye in the second warped image based on the second warped image and independently of the warped image.

11. The computer-implemented method of claim 1, wherein the neural network is trained based on training images that comprise a first set of training images and a second set of training images, wherein the first set of training images show user eyes associated with gaze points in a plane of the camera, and wherein the second set of training images show user eyes associated with gaze points outside the plane of the camera.

12. The computer-implemented method of claim 11, wherein training the neural network comprises:
   inputting a first training image to the neural network, wherein the first training image belongs to the first set of training images;
   inputting a second training image to the neural network, wherein the second training image belongs to the second set of training images; and
   minimizing a loss function of the neural network based on a distance between a gaze point and a gaze line, wherein the gaze point is associated with one of the first training image or the second training image, and wherein the gaze line is predicted by the neural network for a shown user eye from the one of the first training image or the second training image.

13. The computer-implemented method of claim 11, wherein the first training image shows the shown user eye while gazing at the gaze point according to a gaze angle, wherein the second training image shows the shown user eye while gazing at another gaze point according to the gaze angle.

14. The computer-implemented method of claim 11, wherein the first training image and the second training image show the shown user eye while gazing at the gaze point in a gaze angle, wherein the first training image corresponds to a first distance between a training camera and the shown user eye, and wherein the second training image corresponds to a second distance between the training camera and the shown user eye.

15. The computer-implemented method of claim 11, wherein the first training image shows the shown user eye while gazing at the gaze point according to a gaze angle, wherein the second training image shows the shown user eye while gazing at another gaze point according to a different gaze angle.

16. The computer-implemented method of claim 11, wherein training the neural network comprises:
   updating, during the training of the neural network, parameters of the neural network based on calibration parameters, wherein upon completion of the training, inputting updated values for the calibration parameters to the neural network.

17. An eye tracking system, comprising:
   a camera;
   a processor; and
   a memory storing computer-readable instructions that, upon execution by the processor, cause the eye tracking system to perform operations comprising:
      generating, based on a two dimensional (2D) image, a warped image centered around a user eye from the 2D image, wherein the 2D image is generated by the camera;
      inputting the warped image to a neural network, wherein the neural network predicts a distance correction, a 2D gaze origin of the user eye in the warped image, and a 2D gaze direction of the user eye in the warped image based on the warped image;
      generating a corrected distance between the user eye and the camera by at least updating an estimated distance based on the distance correction; and
      generating 3D gaze information for the user eye based on the 2D gaze origin, the 2D gaze direction, and the corrected distance.

18. The eye tracking system of claim 17, wherein the neural network is hosted on a remote system, wherein inputting the warped image comprising transmitting the warped image to the remote system over a data network, and wherein the operations further comprise receiving the distance correction, the 2D gaze origin, and the 2D gaze direction from the remote system over the data network.

19. The eye tracking system of claim 17, wherein the neural network is trained by a remote system, and wherein the operations further comprise downloading code of the neural network from the remote system.

20. A non-transitory computer-readable storage medium comprising instructions, that upon execution on a computer system, configure the computer system perform operations comprising:

generating, based on a two dimensional (2D) image, a warped image centered around a user eye from the 2D image, wherein the 2D image is generated by a camera associated with an eye tracking system;

inputting the warped image to a neural network, wherein the neural network predicts a distance correction, a 2D gaze origin of the user eye in the warped image, and a 2D gaze direction of the user eye in the warped image based on the warped image;

generating a corrected distance between the user eye and the camera by at least updating an estimated distance based on the distance correction; and generating 3D gaze information for the user eye based on the 2D gaze origin, the 2D gaze direction, and the corrected distance.

* * * * *